M. A. BRYSON.

Pannier.

No. 9,178. Reissued April 27, 1880.

Witnesses.

Jules Halbran

O. E. Hoolson

Inventor.

Michael A. Bryson per Forbes & Jones

Attys

N. PETERS, PHOTO-LITHOGRAPHER, WASHINGTON, D. C.

UNITED STATES PATENT OFFICE.

MICHAEL A. BRYSON, OF ST. LOUIS, MISSOURI.

PANNIER.

SPECIFICATION forming part of Reissued Letters Patent No. 9,178, dated April 27, 1880.

Original No. 212,538, dated February 25, 1879. Application for reissue filed August 14, 1879.

*To all whom it may concern:*

Be it known that I, MICHAEL A. BRYSON, of the city and county of St. Louis, State of Missouri, have invented certain new and useful Improvements in Crinoline Skirts or Panniers; and I do hereby declare that the following is a full, clear, and exact description of the invention, which will enable others skilled in the art to which it appertains to make and use the same, reference being had to the accompanying drawings, forming a part of the specification.

This invention relates to crinoline apparel for giving a graceful or desirable shape to the exterior garments.

It consists, broadly, in making a skirt or pannier from any suitable fabric and in any desired shape for such purpose, and filling or stuffing a portion of the same with the hair of cervine animals, such as deer, mountain sheep, elk, antelope, &c.

Figure 1:
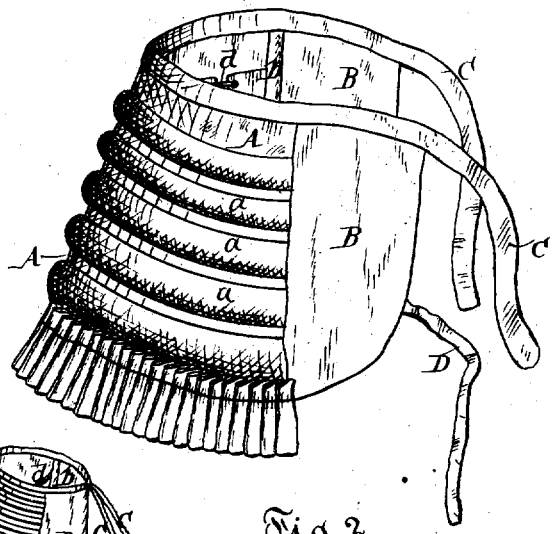
Figure 3:
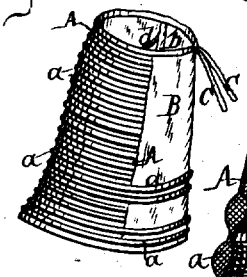
Figure 2:
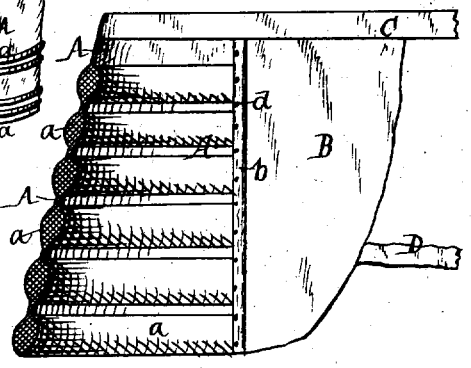
Figure 4:
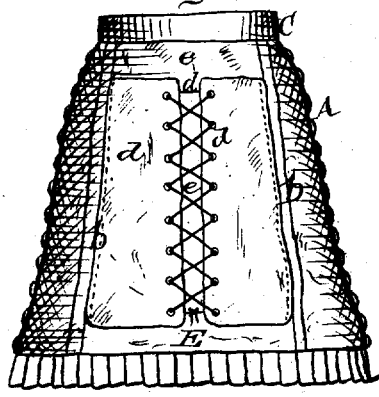

Figure 1 is a perspective view of a pannier constructed according to my invention. Fig. 2 is a vertical section of the same. Fig. 3 is a view of a combined skirt and pannier. Fig. 4 is a rear view of the pannier, showing the elastic diaphragm and lacing-cord.

The invention consists, specifically, in a construction and arrangement of parts hereinafter described, and subsequently defined in the claims.

The accompanying drawings show adaptations of my invention which I have found, in practice, to be an acceptable embodiment of it.

The letter A represents the body or principal portion of the skirt or pannier; B, the apron, which may be divided as in Figs. 1 and 2, or extended in a single piece, as shown in Fig. 3; C, the waistband, and D a fastening-strap. These parts are composed of muslin or other suitable goods, made up in pieces of one or more thicknesses and in convenient lengths to suit different sizes.

The section A is constructed with a series of pipings, *a a*, which are stuffed or filled with the substance referred to, and arranged nearly parallel with the waistband and with each other, at convenient distances apart. In the modification, Fig. 3, one or more of these pipings are extended near the bottom entirely around the skirt. After these pipings are stuffed or filled, strips or pieces *b b* are attached to cover the ends of the same.

E represents an elastic diaphragm, composed of webs *d d*, attached to the body of the skirt, as shown, and their free edges provided with eyelets, through which an elastic lacing, *e*, is passed, the free edges of the webs *d d* being drawn toward each other by the lacing *e* a sufficient distance to give the body of the skirt its arched shape. This diaphragm E may also be made of a single piece of elastic webbing, but should possess such a degree of elasticity as to maintain the arched shape of the body of the skirt or pannier and permit the same to assume a flat or level form under external pressure.

The advantages resulting from the use of the hair of cervine animals for this purpose are due to the natural qualities possessed by no other genus, an equal volume of this substance when compared with the hair of bovine animals, for example, not exceeding one-half the weight of the latter, and yet possessing greater elasticity, strength, and durability.

I do not confine myself to any particular form or construction of this device when stuffed or filled with such material, and I wish it to be understood that the particular construction herein described is only considered a desirable adaptation of it, such construction being also adapted to contain other animal or vegetable fiber as a stuffing or filling suitable for such purpose.

In the construction described a crinoline is produced free from wire, reed, or metallic fixtures of any kind or nature, which not only add to its weight, but soon destroys the article itself and the adjacent garments of the wearer.

Having thus fully described my invention, what I claim, and desire to secure by Letters Patent, is—

1. A crinoline skirt or pannier composed of any suitable fabric, of any desired form, stuffed or filled with the hair of cervine animals, as an improved article of manufacture.

2. A crinoline skirt or pannier composed of any suitable fabric, made up with a series of circumferential tubes or pipings stuffed or filled with animal or vegetable fiber, and provided with an elastic diaphragm, E, substantially as described, whereby its circumferential shape is maintained and rendered collapsible, as set forth.

MICHAEL A. BRYSON.

Witnesses:
CHAS. W. FORBES,
HENRY EARLE.